US010681872B2

United States Patent
Viaene et al.

(10) Patent No.: US 10,681,872 B2
(45) Date of Patent: Jun. 16, 2020

(54) CONTROLLER CONFIGURED FOR CONTROLLING AN UNLOADING SYSTEM AND RELATED METHODS

(71) Applicant: CNH Industrial America LLC, New Holland, PA (US)

(72) Inventors: Karel M. C. Viaene, Moorslede (BE); Pieter Vanysacker, Moere (BE); Bernard E. D. Depestel, Oedelem (BE); Bart M. A. Missotten, Herent (BE); Joachim Boydens, Zedelgem (BE)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 15/030,503

(22) PCT Filed: Oct. 28, 2014

(86) PCT No.: PCT/EP2014/073153
§ 371 (c)(1),
(2) Date: Apr. 19, 2016

(87) PCT Pub. No.: WO2015/063107
PCT Pub. Date: May 7, 2015

(65) Prior Publication Data
US 2016/0270294 A1    Sep. 22, 2016

(30) Foreign Application Priority Data
Oct. 28, 2013  (BE) .................................. 2013/0726

(51) Int. Cl.
*A01D 90/10*     (2006.01)
*A01D 43/073*    (2006.01)
*B65G 67/24*     (2006.01)

(52) U.S. Cl.
CPC .......... *A01D 90/10* (2013.01); *A01D 43/073* (2013.01); *B65G 67/24* (2013.01)

(58) Field of Classification Search
CPC ....... A01D 90/10; A01D 43/073; B65G 67/24
See application file for complete search history.

(56) References Cited

U.S. PATENT DOCUMENTS 8,260,499 B2 *  9/2012  Boydell ............... A01B 69/008
                                                        340/438
8,682,540 B2    3/2014  Missotten et al.
(Continued)

FOREIGN PATENT DOCUMENTS

EP      2510775 A1    10/2012
WO      2011101458    8/2011
(Continued)

OTHER PUBLICATIONS

PCT/EP2014/073153, International Search Report, dated May 7, 2015, 3 pages.
PCT/EP2014/073153, Written Opinion, dated May 7, 2015, 4 pages.

*Primary Examiner* — Jeffrey C Boomer
(74) *Attorney, Agent, or Firm* — Peter Zacharias; Patrick Sheldrake

(57) ABSTRACT

A controller for an unloading system. The unloading system includes an unloading vehicle having an unloading apparatus and a collection vehicle having a container. The unloading apparatus is configured to direct material to the container driven in the vicinity of the unloading vehicle. The controller is configured to receive a user input signal representative of user operation of a vehicle input device associated with driving the unloading vehicle or the collection vehicle and set an attribute of the unloading system in accordance with the user input signal in order to direct the material from the unloading apparatus to the container.

14 Claims, 2 Drawing Sheets

(56) References Cited

U.S. PATENT DOCUMENTS

| | | | |
|---|---|---|---|
| 8,868,304 B2 | 10/2014 | Bonefas | |
| 2002/0082757 A1* | 6/2002 | Behnke | A01D 43/073 701/50 |
| 2002/0083695 A1* | 7/2002 | Behnke | A01B 69/008 56/119 |
| 2009/0044505 A1* | 2/2009 | Huster | A01D 43/087 56/10.2 R |
| 2011/0066337 A1* | 3/2011 | Kormann | A01D 43/087 701/50 |
| 2012/0215409 A1* | 8/2012 | Wang | A01D 41/1278 701/50 |
| 2012/0263560 A1 | 10/2012 | Diekhans et al. | |
| 2012/0316737 A1 | 12/2012 | Missotten et al. | |
| 2013/0211658 A1* | 8/2013 | Bonefas | B65G 67/24 701/28 |
| 2013/0213518 A1* | 8/2013 | Bonefas | A01D 43/073 141/1 |
| 2013/0231820 A1* | 9/2013 | Solyom | G05D 1/0293 701/23 |
| 2013/0231823 A1* | 9/2013 | Wang | A01B 69/008 701/24 |
| 2014/0083556 A1* | 3/2014 | Darr | A01D 43/087 141/1 |
| 2014/0224377 A1* | 8/2014 | Bonefas | A01D 43/073 141/1 |
| 2014/0311113 A1* | 10/2014 | Bonefas | A01D 34/001 56/10.2 R |
| 2014/0350801 A1 | 11/2014 | Bonefas | |

FOREIGN PATENT DOCUMENTS

| | | | | |
|---|---|---|---|---|
| WO | WO 2012112205 A1 * | 8/2012 | | A01B 69/008 |
| WO | 2013120079 | 8/2013 | | |
| WO | WO 2013120079 A1 * | 8/2013 | | A01D 43/087 |

* cited by examiner

CONTROLLER CONFIGURED FOR CONTROLLING AN UNLOADING SYSTEM AND RELATED METHODS

CROSS REFERENCE TO RELATED APPLICATIONS

This application is the National Stage of International Application No. PCT/EP2014/073153 filed Oct. 28, 2014, which claims priority to Belgian Application No. 2013/0726 filed Oct. 28, 2013, each of which applications is incorporated herein by reference in its entirety.

FIELD OF THE INVENTION

The present disclosure relates to unloading systems that include an unloading vehicle such as a forage harvester or a combine harvester, and in particular to controllers for such unloading systems.

BACKGROUND OF THE INVENTION

In forage harvesters of the above type, control of the spout position and of the position of a pivotable end portion (flap) of the spout on the basis of camera images is known in the art. Patent publication WO-A-2011101458 describes a system in which a 3D camera is arranged on the discharge spout. The camera takes images of the container driving next to the machine. These images define at least two vertical strips. Analysis of these strips provides the position of the front and/or rear wall of the container relative to the camera. Based on this information, the spout is controlled so that the crop material is unloaded in the container.

SUMMARY OF THE INVENTION

According to a first aspect of the invention, there is provided a controller for an unloading system, the unloading system comprising an unloading vehicle having an unloading apparatus and a collection vehicle having a container, wherein the unloading apparatus is configured to direct material to the container driven in the vicinity of the unloading vehicle, and wherein the controller is configured to:
  receive a user input signal representative of user operation of a vehicle input device associated with driving the unloading vehicle and/or collection vehicle; and
  set an attribute of the unloading system in accordance with the user input signal in order to direct the material from the unloading apparatus to the container.

Herein, "driving" means controlling the speed and direction of the vehicle. In this way, the unloading system can be automatically controlled using the commands of the user or operator for driving the unloading vehicle and/or collection vehicle (by operating a vehicle input device). The way in which the user drives will affect how the material is unloaded. Therefore the controller can quickly and efficiently take into account the expected changes to the way the material is unloaded, without having to wait for the resultant effect on the speed or direction of either vehicle. This proactive reaction can reduce spillage of the material from the container.

The controller may be configured to set the attribute of the unloading system in order to change the relative positioning of the unloading apparatus and the container.

The controller may be configured to set the attribute of the unloading system in order to direct the material from the unloading apparatus to a different region within the container, such as a front region or back region of the container relative to the direction of travel of the unloading vehicle.

The controller may be configured to determine an offset value for the attribute of the unloading system, and to set the attribute of the unloading system by adding or subtracting the offset value to a main value for the attribute.

The vehicle input device may comprise a steering device, such as a steering wheel, joystick or a multi-function handle.

The vehicle input device may comprise a speed control device, such as a multi-function handle, throttle controller/pedal or a brake controller/pedal.

The user input signal may be representative of a vehicle drive signal, which has been set in accordance with the user operation of the vehicle input device. The vehicle drive signal may comprise a drive signal to the pump of a ground drive of the vehicle.

The controller may be configured to set an attribute of the unloading apparatus and/or an attribute of the unloading vehicle or collection vehicle.

The attribute of the unloading apparatus may comprise one or more of an angular position of the unloading apparatus about a vertical axis, an angular position of the unloading apparatus about a horizontal axis, an angular position of a pivotable flap at a distal end of the unloading apparatus, a material discharge rate or force. The attribute of the unloading vehicle or collection vehicle may be speed and/or direction. The controller may be configured to set a rate of change, absolute value, or upper or lower limit of one or more of the above attributes.

The controller may be further configured to:
  receive image data representative of at least a portion of the container; and
  set the attribute of the unloading system in accordance with both the user input signal and the image data in order to direct the crop material from the unloading apparatus to the container.

The image data may comprise 3-dimensional image data.

There may be provided an unloading system comprising:
  any controller disclosed herein; and
  a sensor configured to generate the user input signal by detecting user operation of the vehicle input device.

There may be provided an agricultural harvesting machine comprising:
  an unloading apparatus, and
  any controller disclosed herein.

According to a further aspect of the invention, there is provided a method of controlling an unloading system, the unloading system comprising an unloading vehicle having an unloading apparatus and a collection vehicle having a container, wherein the container is driven in the vicinity of the unloading vehicle, the method comprising:
  receiving a user input signal representative of user operation of a vehicle input device associated with driving the unloading vehicle and/or collection vehicle; and
  setting an attribute of the unloading system in accordance with the user input signal in order to direct material from the unloading apparatus to the container.

The method may further comprise:
  receiving image data representative of at least a portion of the container; and
  setting the attribute of the unloading system in accordance with both the user input signal and the image data in order to direct the crop material from the unloading apparatus to the container.

There may be provided a computer program, which when run on a computer, causes the computer to configure any apparatus, including a controller, unloading system, and agricultural harvesting machine disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples.

The computer program may be provided on a computer readable medium, which may be a physical computer readable medium such as a disc or a memory device, or may be embodied as a transient signal. Such a transient signal may be a network download, including an internet download.

Embodiments of the present invention will now be described by way of example and with reference to the accompanying drawings in which:

DETAILED DESCRIPTION OF THE DRAWINGS

Figure 1:
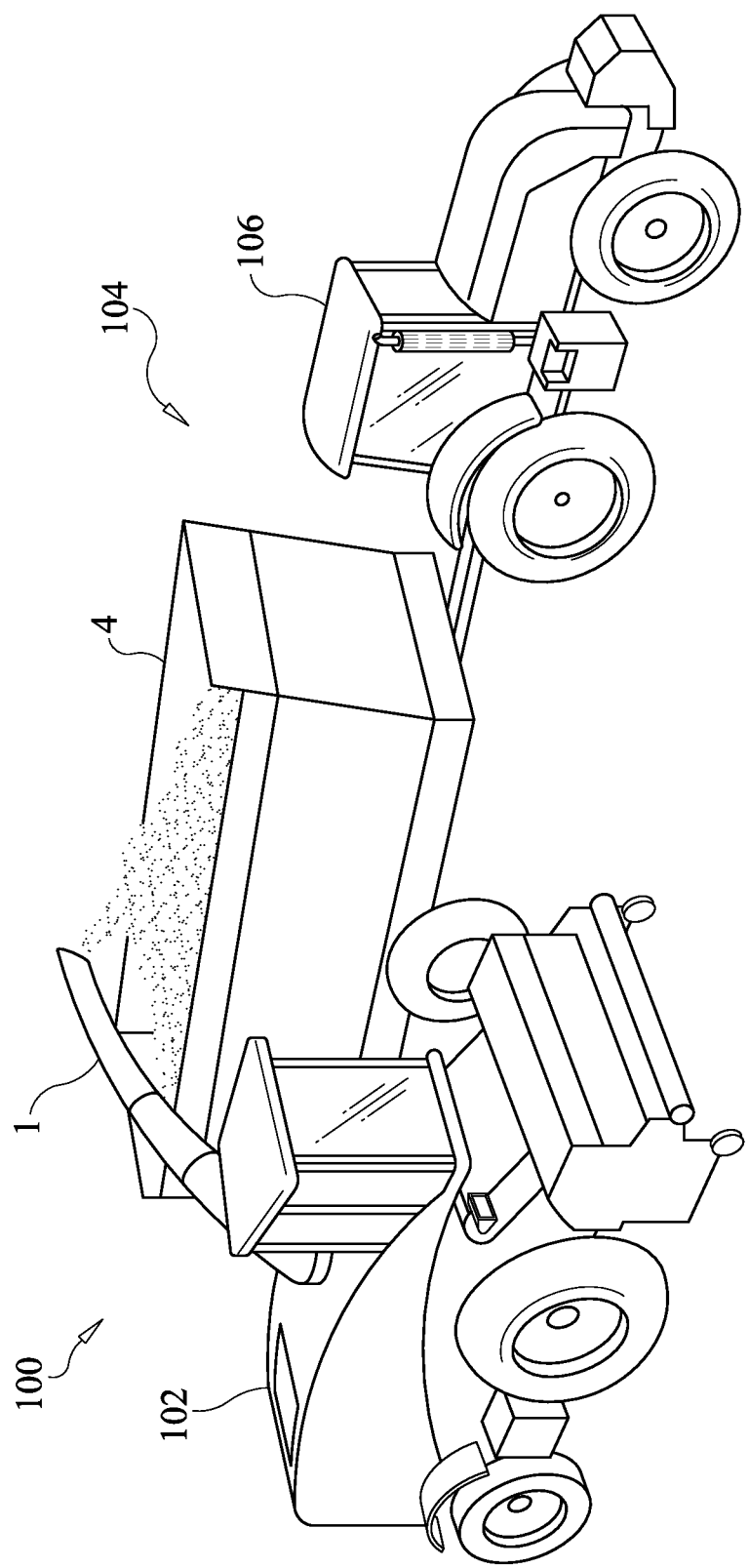
FIG. 1 schematically shows an unloading system.
Figure 2:
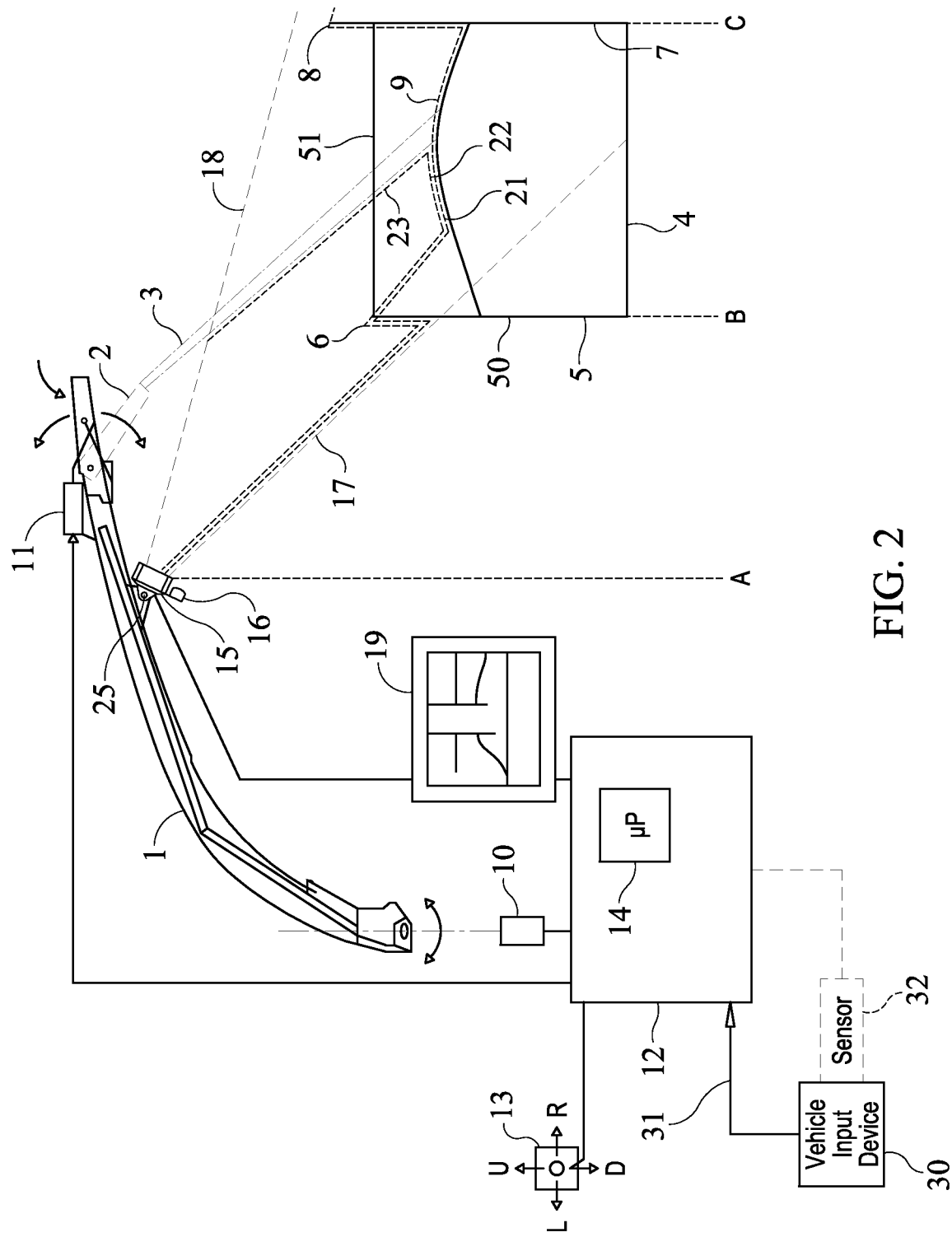
FIG. 2 schematically shows a discharge spout of an agricultural harvesting machine and a container.

FIGS. 1 and 2 are examples of an unloading system in the agricultural industry. It will be appreciated from the description that follows that examples disclosed herein can also be used in other industries, for example in construction.

FIG. 1 shows schematically an unloading system 100. The unloading system 100 comprises an unloading vehicle 102, which in this example is an agricultural harvesting machine such as a forage harvester or a combine harvester. The agricultural harvesting machine 102 has an unloading apparatus 1, which in this example is a discharge spout. Further details of the discharge spout 1 are provided below with reference to FIG. 2. The unloading system 100 also has a collection vehicle 104 having a container 4 for receiving material that has been unloaded by the unloading vehicle 102. In this example, the collection vehicle is a tractor 106 that tows the container 4 and the material is a crop. In another example, the collection vehicle may be a truck with a container for receiving the material. The discharge spout 1 of the agricultural harvesting machine 102 directs crop to the container 4 driven in the vicinity of the agricultural harvesting machine 102. For example, the container 4 may be driven either behind or next to the agricultural harvesting machine.

As will be described below with reference to FIG. 2, the unloading system 100 also includes a controller for setting an attribute of one or more elements of the unloading system 100 in accordance with a user input signal 31, which is representative of user operation of a vehicle input device (such as a steering wheel, throttle or brake) that is used to drive one or both of the agricultural harvesting machine 102 and collection vehicle 104. For example, an attribute of the discharge spout 1 may be set. Alternatively or additionally, an attribute of the vehicle that is not associated with the vehicle input device may be set. Such an attribute may be speed or driving direction. That is, the controller may automatically set the speed or direction of the tractor 106 in accordance with the way a user is driving the agricultural harvesting machine 102, or vice versa.

FIG. 2 shows a schematic image of the container 4 and discharge spout 1 shown in FIG. 1. The discharge spout 1 is an example of a movable unloading apparatus. The base of the discharge spout 1 is mounted for rotation about a vertical axis and pivoting about a horizontal axis on an agricultural harvesting machine (not shown), in a manner known in the art. The discharge spout 1 is used to direct a stream 3 of processed crop material from the agricultural harvesting machine to the container 4. The container 4 and discharge spout 1 are movable relative to each other.

The container 4 has a near wall 5, closest to the agricultural harvesting machine, and an opposite, remote wall 7. The near wall 5 has an upper border/edge 6 and the remote wall 7 also has an upper border/edge 8. Crop material is deposited into the container 4 from the discharge spout 1 and forms a heap 9 therein.

The base of the discharge spout 1 is equipped with an actuator, for example a hydraulic motor 10, for changing the angular position of the discharge spout 1 about the vertical axis. The discharge spout 1 is also equipped with a further actuator, for example a hydraulic cylinder (not shown), for changing the height of the distal end of the discharge spout 1 by controlling the angle of the discharge spout about the horizontal axis. The discharge spout 1 further has a pivotable flap 2 at its distal end, equipped with a third actuator, for example a linear electrical actuator 11, for changing the angle of the pivotable flap 2 about a horizontal axis. The three actuators are controlled by a controller 12 in order to direct the stream 3 of processed crop material into the container 4. The controller 12 may be governed by a manual control 13 or by a microprocessor 14 that implements any known control algorithm such as the one described in WO-A-2011/101458. Such manual control and known control algorithm will be referred to as a main control methodology.

Optionally, a camera 15 and a light source 16 are mounted on the discharge spout 1, below the pivotable flap 2 as shown in FIG. 2. The camera 15 is configured to produce images 19 as arrays of pixels. The camera 15 may be a 3-D camera that also provides depth data representative of the distance between the camera and objects shown in the image, for each pixel in the image. This depth data may be determined on the basis of the well-known time-of-flight principle. The field of the camera is represented in FIG. 1 by the border lines 17 and 18. The light source 16 is preferably a Near Infra Red (NIR) lamp, which emits modulated light with a certain wavelength. Reflected light of the same wavelength is captured by the camera 15.

The camera 15 is positioned such that it records images 19 that include at least a portion of the container 4, and optionally also the stream of crop material 3 as it passes from the discharge spout 1 to the container 4. The recorded images 19 can be used as part of the main control methodology as is known in the art.

Also shown in FIG. 2 is a vehicle input device 30 associated with driving the agricultural harvesting machine or collection vehicle. That is, the vehicle input device 30 may be located in either the agricultural harvesting machine or the collection vehicle, and may be in wired or wireless communication with the controller 12. Optionally, the agricultural harvesting machine and the collection vehicle may both have a vehicle input device that is in communication with the controller 12.

Examples of the vehicle input device 30 include:
a steering device, such as a steering wheel, joystick or a multi-function handle. The multi-function handle may be user operable to also receive non-steering related user commands.

a speed control device, such as a multi-function handle, throttle controller/pedal, or a brake controller/pedal.

The vehicle input device 30 provides a user input signal 31 to the controller 12. The user input signal 31 is representative of user operation of the vehicle input device 30. It will be appreciated from the description that follows that due to this user input signal 31, the unloading system can be controlled quickly and proactively.

The unloading system may also include an optional sensor 32 associated with the vehicle input device 30. The sensor 32 can generate the user input signal 31 for the controller 12 by detecting user operation of the vehicle input device 30. For example, the sensor 32 may be a displacement or motion sensor that can generate the user input signal 31 in accordance with the displacement or movement of the vehicle input device 30. By way of non-limiting examples: a potentiometer or encoder wheel can be mechanically linked to the steering wheel or multifunction handle; a switch can be linked to the brake pedal to detect an application of the brakes; or a potentiometer can be linked to the brake pedal to detect a braking force.

In some examples the user input signal 31 that is provided to the controller 12 is representative of a vehicle drive signal, which has been set in accordance with the user operation of the vehicle input device 30. For example, the vehicle drive signal may comprise a drive signal that is provided to the pump of a ground drive of the vehicle, or any other signal that is internal to the vehicle and is representative of how the vehicle input device 30 has been manipulated. The vehicle drive signal may be independent of how the vehicle's motion (such as speed or driving direction) actually changes; instead it may be representative of an instruction to change the vehicle's motion. Such a vehicle drive signal may be available from an on-board diagnostics (OBD) system associated with the vehicle.

The user input signal 31 is used by the controller 12 to set an attribute of the unloading system in a predictive way based on how the relative positioning of the unloading apparatus 1 and container 4 is expected to change in accordance with how a person is driving one or both of the vehicles (the agricultural harvesting machine and/or the collection vehicle). This avoids a need to wait for the resultant effect on the vehicle (such as a change in speed or driving direction) such that the unloading system can advantageously be controlled quickly and crop spillage can be reduced.

The controller 12 uses the user input signal 31 to set an attribute of the unloading system in order to direct the crop material from the discharge spout 1 to the container 4. The attribute can be one or more of the following:

1. The angular position of the discharge spout about a vertical axis, for example by controlling the hydraulic motor 10. This may be referred to as spout rotation.
2. The angular position of the discharge spout about a horizontal axis, for example by controlling the hydraulic cylinder (not shown). This may be referred to as spout elevation.
3. The angular position of the pivotable flap 2, for example by controlling the linear electrical actuator 11. This may be referred to as flipper angle.
4. The driving speed or direction of the vehicle that is not associated with the vehicle input device. For example, if the user input signal 31 is associated with a vehicle input device 30 of the agricultural harvesting machine, then the driving speed or direction of the collection vehicle can be set. Similarly, if the user input signal 31 is associated with a vehicle input device 30 of the collection vehicle, then the driving speed or direction of the agricultural harvesting machine can be set.
5. A crop discharge rate, which may be particularly advantageous for a combine harvester with a grain tank. This may involve setting a discharge force such as a revolutions per minute (rpm) value of a blower in an agricultural harvesting machine.

Additionally or alternatively, the rate of change of one or more of the above attributes (and not necessarily the absolute value) and/or an upper or lower limit of an attribute value can be set in accordance with the user input signal 31.

The controller 12 can determine a predicted change in unloading characteristics of the unloading system based on the expected change in motion of one or both of the agricultural harvesting machine and collection vehicle due to the user operation of the vehicle input device 30. The controller 12 can then automatically control the unloading system in accordance with the predicted change in the unloading characteristics in order to better direct the crop material 3 from the discharge spout 1 to the container 4. For example, the controller 12 can change the relative positioning of the unloading apparatus 1 and the container 4. This control will be referred to as a predictive control methodology and can be used to supplement the main control methodology in order to reduce crop wastage.

The predictive control methodology may determine an offset value for one or more of the above attributes in accordance with the predicted change in relative positioning of the discharge spout 1 and container 4 due to user operation of the vehicle input device 30. The offset values may be added to the corresponding main values in order to control the discharge spout in such a way as to put the discharge spout 1 in a position relative to the container 4 that will be advantageous when the vehicle reacts to the user operation of the vehicle input device. For example, if the driver of the agricultural harvesting machine presses a throttle pedal to accelerate the agricultural harvesting machine, an offset value can be subtracted from the spout rotation attribute such that the discharge spout is immediately positioned at the back of the container 4, thereby reducing the likelihood that the discharge spout 1 will be aimed at a position in front of the container 4 when the agricultural harvesting machine speeds up. Similarly, an offset value can be added to the spout rotation attribute when a brake is applied to the agricultural harvesting machine such that the discharge spout 1 is immediately positioned at the front of the container 4. That is, the crop material can be directed more towards the front or the back of the container 4 (or more towards the left or right), relative to the direction of travel of the unloading vehicle. In this way, it can be less likely that the crop ejected by the discharge spout 1 will miss the container 4 when the vehicle reacts to the user operation of the vehicle input device.

In one example, the predictive control methodology may be a predictive algorithm that uses the information in the received user input signal to calculate the offset value. The predictive algorithm may or may not apply a linear function. Alternatively, a database or look-up table can be used by the predictive control methodology to determine the offset value.

In one example, the predictive control methodology may add or subtract a predetermined angle to the main value for the discharge spout's angular position about its vertical axis. It will be appreciated that the size of the predetermined angle will be specific to the dimensions of the apparatus involved.

For examples where the main control methodology is manual control, the controller may be configured to set an attribute of the unloading system by setting an upper and/or lower limit of an absolute value, or rate of change of the value, that can be applied to the attribute by the manual control. For example, if the controller determines that the agricultural harvesting machine is about to accelerate, then the controller may set an upper limit on the angular position of the discharge spout such that it is not aimed at a region within the container that is too far forward.

In the above examples, the unloading apparatus is movable such that an attribute of the unloading apparatus can be set in order to direct the crop from the unloading apparatus to the container. It will be appreciated that alternatively or additionally, an attribute of the unloading vehicle and/or container can be set in a similar way in order to direct the crop from the unloading apparatus to the container. Such an attribute may be speed, in some examples the speed of the unloading vehicle relative to the speed of the container, or vice versa. In such examples, the unloading apparatus may be fixed, that is, not movable.

One or more example disclosed herein can determine and make use of predictive information that is derived from user input. More specifically, from user input for operating the vehicles (harvester and/or transport vehicle). Advantageously, the system can then 'react' before the speeds of the vehicles have actually been changed, and it is not necessary to detect that the speed has changed before the change can be taken into account. Optionally, sensors are provided for registering actual user interaction with the vehicle's input devices.

The skilled person will appreciate that one or more of the examples disclosed herein are equally applicable to the construction industry and other industries that have unloading systems.

The invention claimed is:

1. A controller for an unloading system, the unloading system comprising an unloading vehicle having an unloading apparatus and a collection vehicle having a container, and a camera, wherein the unloading apparatus is configured to direct material to the container driven in the vicinity of the unloading vehicle, the controller comprising:
a processor and associated memory, the memory storing a computer-readable program that, when executed by the processor, configures the controller to:
receive image data from the camera representative of at least a portion of the container;
set an attribute of the unloading system to a main value dependent upon the image data in order to direct the crop material from the unloading apparatus to the container;
receive a user input signal representative of user operation of a vehicle input device associated with driving the unloading vehicle and/or the collection vehicle;
use the user input signal to determine an offset value for the attribute of the unloading system depending on how positioning of the unloading apparatus relative to the container is expected to change dependent upon the user input signal, the user input signal being representative of user operation of the vehicle input device, the use of the vehicle input device by the user causing a change in motion of the unloading vehicle and/or the collection vehicle, the change in motion causing a change in the positioning of the unloading apparatus relative to the container, the change being the change that is expected in the positioning of the unloading apparatus relative to the container due to the use of the vehicle input device;
set the attribute of the unloading system in accordance with the user input signal by adding or subtracting the offset value to/from the main value for the attribute; and
direct the material from the unloading apparatus to a different region within the container dependent upon the set attribute.

2. The controller according to claim 1, further configured to set the attribute of the unloading system in order to change the relative positioning of the unloading apparatus and the container.

3. The controller according to claim 1, further configured to set the attribute of the unloading system in order to direct the material from the unloading apparatus to a front region or back region of the container, relative to a direction of travel of the unloading vehicle.

4. The controller according to claim 1, wherein the vehicle input device comprises a steering device, a steering wheel, a joystick or a multi-function handle.

5. The controller according to claim 1, wherein the vehicle input device comprises a speed control device, a multi-function handle, a throttle controller, or a brake controller.

6. The controller according to claim 1, wherein the user input signal is representative of a vehicle drive signal, which has been set in accordance with the user operation of the vehicle input device.

7. The controller according to claim 1, further configured to set an attribute of the unloading apparatus.

8. The controller according to claim 1, further configured to set an attribute of the unloading vehicle or the collection vehicle.

9. The controller according to claim 1, wherein the image data comprises 3-dimensional image data.

10. An unloading system comprising:
an unloading vehicle having an unloading apparatus and a camera;
a collection vehicle having a container, the unloading apparatus being configured to direct material to the container driven in the vicinity of the unloading vehicle, the unloading apparatus including a spout;
a sensor configured to generate a user input signal by detecting user operation of a vehicle input device; and
a controller comprising a processor and associated memory, the memory storing a computer-readable program that, when executed by the processor, configures the controller to:
receive image data from the camera representative of at least a portion of the container;
set an attribute of the unloading system to a main value dependent upon the image data in order to direct the crop material from the unloading apparatus to the container;
receive the user input signal representative of user operation of the vehicle input device associated with driving the unloading vehicle or the collection vehicle;
use the user input signal to determine an offset value for the attribute of the unloading system taking into account how positioning of the unloading apparatus relative to the container is expected to change dependent upon the user input signal, the user input signal being representative of user operation of the vehicle input device, the use of the vehicle input device by the user causing a change in motion of the unloading vehicle and/or the collection vehicle, the change in motion causing a change in the positioning of the unloading apparatus relative to the container, the change being the change that is expected in the positioning of the unloading apparatus relative to the container due to the use of the vehicle input device; and set the attribute of the unloading system in accordance with the user input signal by adding or subtracting the offset value to/from the main value for the attribute in order to direct the material from the unloading apparatus to a different region within the container.

11. A method of controlling an unloading system, the unloading system comprising an unloading vehicle having an unloading apparatus, a collection vehicle having a container, and a camera, wherein the container is driven in the vicinity of the unloading vehicle, the method comprising steps of:

receiving, with a processor, image data from the camera representative of at least a portion of the container;

setting, with the processor, an attribute of the unloading system to a main value dependent upon the image data in order to direct the crop material from the unloading apparatus to the container;

receiving, with the processor, a user input signal representative of user operation of a vehicle input device associated with driving the unloading vehicle or the collection vehicle;

using, with the processor, the user input signal to determine an offset value for the attribute of the unloading system taking into account how positioning of the unloading apparatus relative to the container is dependent upon the user input signal, the user input signal being representative of user operation of the vehicle input device, the use of the vehicle input device by the user causing a change in motion of the unloading vehicle and/or the collection vehicle, the change in motion causing a change in the positioning of the unloading apparatus relative to the container, the change being the change that is expected in the positioning of the unloading apparatus relative to the container due to the use of the vehicle input device; and setting, with the processor, the attribute of the unloading system in accordance with the user input signal by adding or subtracting the offset value to/from the main value for the attribute in order to direct the material from the unloading apparatus to a different region within the container.

12. The method according to claim 11, further comprising a step of:

setting, with the processor, the attribute of the unloading system in order to change the relative positioning of the unloading apparatus and the container.

13. The method according to claim 11, wherein the step of setting, with the processor, the attribute of the unloading system in order to direct the material from the unloading apparatus to the different region within the container comprises setting, with the processor, the attribute of the unloading system in order to direct the material from the unloading apparatus to a front region or back region of the container, relative to a direction of travel of the unloading vehicle.

14. The method according to claim 11, further comprising a step of receiving, with the processor, image data representative of at least a portion of the container, wherein the step of setting the attribute comprising setting the attribute of the unloading system in accordance with both the user input signal and the image data in order to direct the material from the unloading apparatus to the container.

* * * * *